(12) United States Patent
Lo

(10) Patent No.: US 6,343,306 B1
(45) Date of Patent: Jan. 29, 2002

(54) HIGH SPEED ONE'S COMPLEMENT ADDER

(75) Inventor: John Lo, Fremont, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/313,949

(22) Filed: May 18, 1999

(51) Int. Cl.[7] ............................. G06F 7/50; G06F 11/10
(52) U.S. Cl. ...................... 708/700; 708/714; 714/807
(58) Field of Search ............................. 708/670, 672, 708/700, 711; 714/807; 333/166; 370/252

(56) References Cited

U.S. PATENT DOCUMENTS

| | | | |
|---|---|---|---|
| 4,084,252 A | | 4/1978 | Miller |
| 4,099,248 A | | 7/1978 | Borgerson et al. |
| 4,243,959 A | * | 1/1981 | Duttweiler ................. 333/166 |
| 4,298,952 A | | 11/1981 | Guenthner et al. |
| 4,484,301 A | | 11/1984 | Borgerding et al. |
| 4,525,797 A | | 7/1985 | Holden |
| 5,663,952 A | * | 9/1997 | Gentry, Jr. ................. 370/252 |
| 5,764,550 A | | 6/1998 | D'Souza |
| 5,912,909 A | * | 6/1999 | McCoy ........................ 714/807 |

* cited by examiner

Primary Examiner—Chuong Dinh Ngo
(74) Attorney, Agent, or Firm—Philip H. Albert; Townsend and Townsend and Crew LLP

(57) ABSTRACT

A one's complement adder uses two two's complement adders, both of which are coupled to receive first and second addends at their addend inputs, however the first two's complement adder is adapted to output a first sum that is the one's complement sum that would result if no carry occurred upon addition of the first and second addends and the second two's complement adder is adapted to output a second sum that is the one's complement sum that would result if a carry did occur. A selector selects one of the first sum and the second sum as its output (and the output of the one's complement adder) based on whether or not a carry occurred. The indication of whether or not a carry occurred or not can be determined from the carry output of the first complement adder, with the first sum effected by setting the carry input for the first two's complement adder to "0" (no carry in) and the second sum effected by setting the carry input for the second two's complement adder to "1" (carry in). The selector can be a multiplexer with a select input coupled to the carry output of the first two's complement adder.

10 Claims, 4 Drawing Sheets

IP HEADER

UDP HEADER

HIGH SPEED ONE'S COMPLEMENT ADDER

BACKGROUND OF THE INVENTION

The present invention relates to adders in general and in particular to one's complement adders built from two's complement adders.

Two's complement adders and one's complement adders are circuits used to add binary numbers, typically adding two binary numbers at a time. The operation of such adders is essentially the same for different sizes of binary numbers, but the addends and the sums are normally all represented by the same number of bits.

Binary addition (one's complement and two's complement) can be explained with a few simple examples. Suppose the two four-bit binary numbers 0011 and 0110 are being added. With two's complement addition, the sum of these two numbers is 1001. Two's complement addition corresponds well to the grade school notion of addition, in that 0011 and 0110 are binary representations of 3 and 6, respectively, and 1001 is the binary representation of 9, which is the sum of 3 and 6. Where N-bit binary numbers are being added and the sum is greater than $2^{N-1}$, a carry results. For example, 1001 and 1000 sum to 0001 and a carry (the carry bit representing in "1" in the 16's column). With one's complement addition, the carries are added back to the result. Thus, the one's complement sum of 0011 and 0110 is 1001 (as with two's complement addition), but the one's complement sum of 1001 and 1000 is 0010.

Two's complement adders are much more prevalent than one's complement adders because two's complement addition is used more. As standard cell logic developed, many cell developers refined and optimized two's complement adder cells. Cells are preconfigured and pre-tested logic components for a particular process technology, usually a discrete logic technology or a semiconductor technology such as ECL or CMOS. While many two's complement adders have been developed for use in various process technologies, one's complement adders are not typically developed. Instead, one's complement adders are formed from two's complement adders.

One common and simple approach to creating an one's complement adder out of a two's complement adder is to start with a standard two's complement adder and connect the carry output of the two's complement adder to the carry input of the two's complement adder to effect the one's complement addition. Thus, the addends are added and, if the result of that addition generated a carry, the carry input is added to the result. This two-step process is a well-known approach to making a one's complement adder out of a two's complement adder. An example of such a one's complement adder is shown in FIG. 1. There, a two's complement adder 10 is configured to be a one's complement adder by coupling the carry output of two's complement adder 10 (COUT) to the carry input of two's complement adder 10 (CIN). Thus, when two N-bit addends, A and B, are applied to the addend inputs of two's complement adder 10 (IN1 and IN2), the resulting N-bit output, R, is provided at the output of two's complement adder 10 (OUT), where R=A+B, with "+" representing the N-bit one's complement addition operation.

Of course, the circuit must take into account that the two addends must be added together and the sum generated before the carry input is taken into account. Otherwise, a race condition might occur. One solution to the race problem is proposed in U.S. Pat. No. 4,298,952. As shown in that patent, the carry output can be conditioned into a generate signal G that is coupled to the carry input instead of the carry output.

While the conventional uses of two's complement adders to form one's complement adders work well in practice, they are often too slow for some applications. While changing to faster process technologies might increase the speed of a circuit, a better result is usually had by reducing the number of logic cycles needed for a given operation.

SUMMARY OF THE INVENTION

The problems of the prior art described above are overcome by the present invention. A one's complement adder according to one embodiment of the present invention uses two two's complement adders. Both of the two's complement adders are coupled to receive first and second addends at their addend inputs, however the first two's complement adder is adapted to output a first sum that is the one's complement sum that would result if no carry occurred upon addition of the first and second addends and the second two's complement adder is adapted to output a second sum that is the one's complement sum that would result if a carry did occur. A selector selects one of the first sum and the second sum as its output (and the output of the one's complement adder) based on whether or not a carry occurred.

In a particular embodiment, the indication of whether or not a carry occurred or not is determined from the carry output of the first complement adder. In a specific embodiment, the first sum is effected by setting the carry input for the first two's complement adder to "0" (no carry in), the second sum is effected by setting the carry input for the second two's complement adder to "1" (carry in) and the selector is a multiplexer with a select input coupled to the carry output of the first two's complement adder.

One advantage of such a one's complement adder is that the addition occurs in one pass instead of the passes of the conventional one's complement adder.

A further understanding of the nature and advantages of the inventions herein may be realized by reference to the remaining portions of the specification and the attached drawings.

BRIEF DESCRIPTION OF THE DRAWINGS

FIG. 3 illustrates packet datagrams.

DESCRIPTION OF THE SPECIFIC EMBODIMENTS

Figure 1:
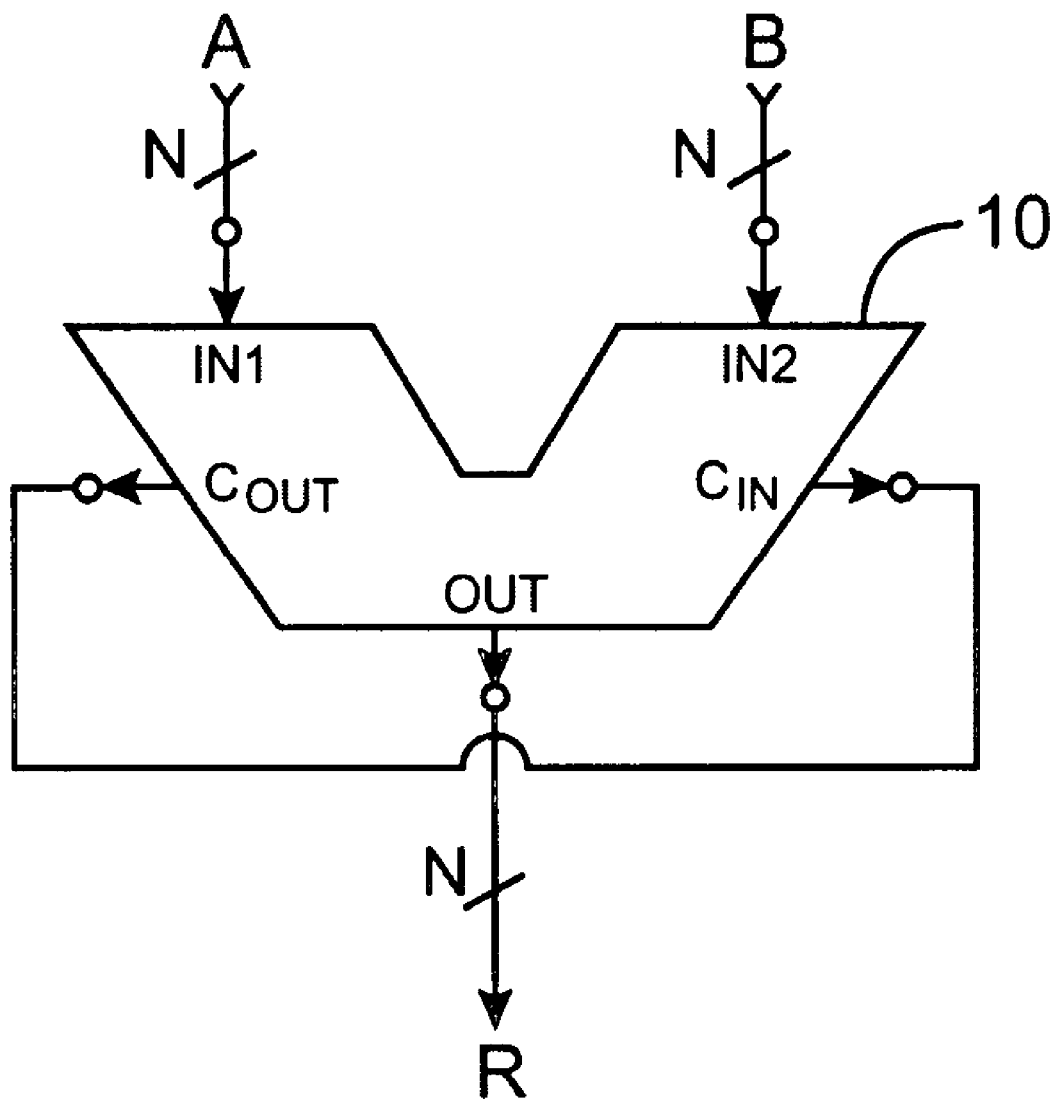
FIG. 1 is a schematic diagram of a prior art one's complement adder.
Figure 2:
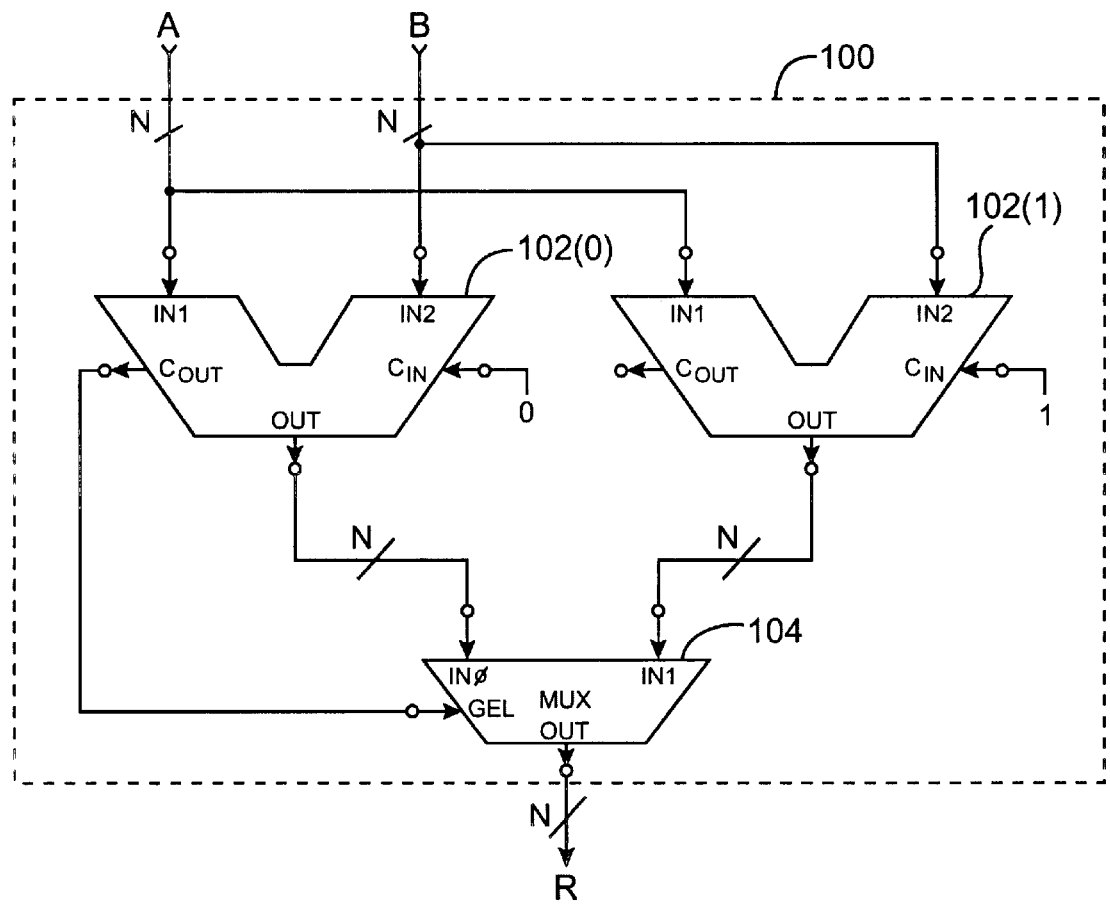
FIG. 2 is a schematic diagram of a one's complement adder according to one embodiment of the present invention.

One specific embodiment of a one's complement adder 100 is shown in the schematic diagram shown as FIG. 2. One's complement adder 100 is shown comprising two two's complement adders 102 and a multiplexer 104. When a specific two's complement adder is referenced, the label "102(0)" or "102(1)" is used. Each two's complement adder 102 includes two addend inputs, IN1 and IN2, a carry out output COUT, a carry in input CIN and a two's complement addition output OUT. Multiplexer 104 includes two selection inputs IN0 and IN1, a selection input SEL and an output OUT.

In the schematic diagram of FIG. 2, the binary values of two addends, A and B, are provided to addend inputs of one's complement adder 100, which are coupled within one's complement adder 100 to the addend inputs of two's complement adders 102, with the addend A being applied to the addend input IN1 of each two's complement adder 102 and the addend B being applied to the addend input IN2 of each two's complement adder 102. A logical level indicating "no carry" ("0" in this example) is applied to two's complement adder 102(0), while a logical level indicating "carry" ("1" in this example) is applied to two's complement adder 102(1). The output OUT of two's complement adder 102(0) is coupled to the input IN0 of multiplexer 104 and the output OUT of two's complement adder 102(1) is coupled to the input IN1 of multiplexer 104. As for the carry out outputs, the COUT output of two's complement adder 102(0) is coupled to the selection input SEL of multiplexer 104 and the COUT output of two's complement adder 102(1) is left unconnected.

If necessary, two's complement adders 102 and the output of one's complement adder 100 are clocked by a clock signal (not shown) and the addends A and B are supplied at the appropriate time within a clock period. As the addends are applied to two's complement adders 102, two's complement adder 102(0) generates a sum that would be the one's complement sum of A and B if there were no carry and two's complement adder 102(1) generates a sum that would be the one's complement sum of A and B if there were a carry. About the same time that two's complement adders 102 output their results to multiplexer 104, two's complement adder 102(0) outputs the carry signal ("carry" or "no carry") for the addition. As can be seen from the schematic of FIG. 2, if there is a carry, the resultant one's complement sum, R, is the sum output by two's complement adder 102(1), but if there is no carry, R is the sum output by two's complement adder 102(0).

As described above, the circuit shown in FIG. 2 will output the correct one's complement sum in one clock cycle (half the time it would take one two's complement adder to perform the full operation). That circuit trades off less efficient use of chip real estate (since two two's complement adders are needed where only one was needed in the prior art scheme) to increase processing speed. In many applications, speed is more critical than chip space usage. One such application is error checking checksums in a packet-switched network.

Figure 3A:
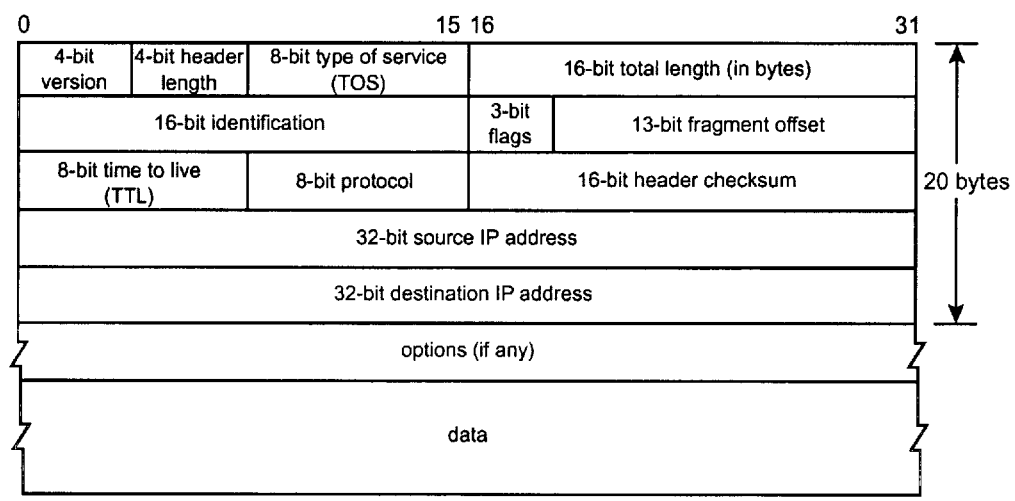
FIG. 3(a) shows the format of an IP packet datagram and FIG. 3(b) shows the format of a UDP packet datagram.
Figure 3B:
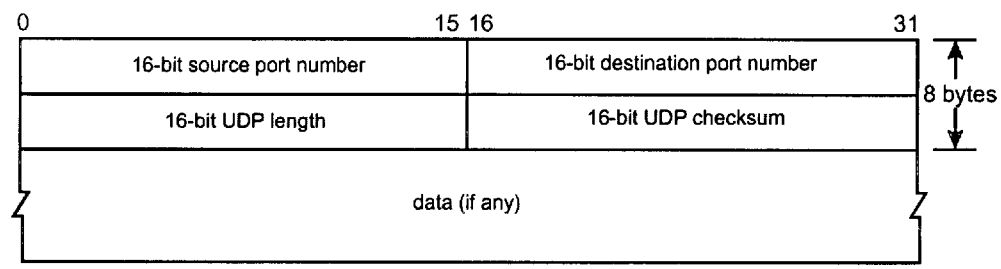

The Internet is, at its core, a packet-switched network. Two common protocols for Internet packet traffic are TCP/IP (Transport Control Protocol/Internet Protocol) packets and UDP (User Datagram Protocol) packets. FIG. 3 shows examples of packet datagrams; FIG. 3(a) shows the format of an IP packet datagram and FIG. 3(b) shows the format of a UDP packet datagram. As shown, both IP packets and UDP packets include 16-bit header checksum fields.

As a router or other packet handling device receives and forwards packets, it is often desirable for the device to drop corrupted packets instead of forwarding them. There are many benefits to dropping corrupted packets, such as the fact that it reduces the downstream work that has to be done on data that cannot be used anyway and it may reduce the time it takes the sender or receiver to detect that a packet was lost and needs to be retransmitted. One way to detect corrupted packets is to check the checksums of the packets as they pass though the device. However, since packets are relatively small, many packets must pass through the device in a given time span, if the packets are to be checked, the checksums must be checked very quickly.

In the IP protocol, the checksum of a packet is calculated by treating the packet's header as a sequence of 16-bit words and taking the one's complement sum of all the words (except the word representing the checksum itself) and using the one's complement of the resulting sum as the checksum. Thus, upon receipt of a packet, the device can check for corruption by performing a 16-bit one's complement addition of all the words of the packet's header.

Various other Internet protocols use the same checksum process, such as ICMP (Internet Control Message Protocol) and IGMP (Internet Group Management Protocol). Other non-Internet protocols also might use a similar checksum process. Given that the checksums need to be calculated very quickly, it is advantageous to use the one's complement adder described above. In one prototype ASIC (application specific integrated circuit), operating with a 133 MHz clock speed, a one's complement addition operation is completed in about 7.5 ns.

Figure 4:
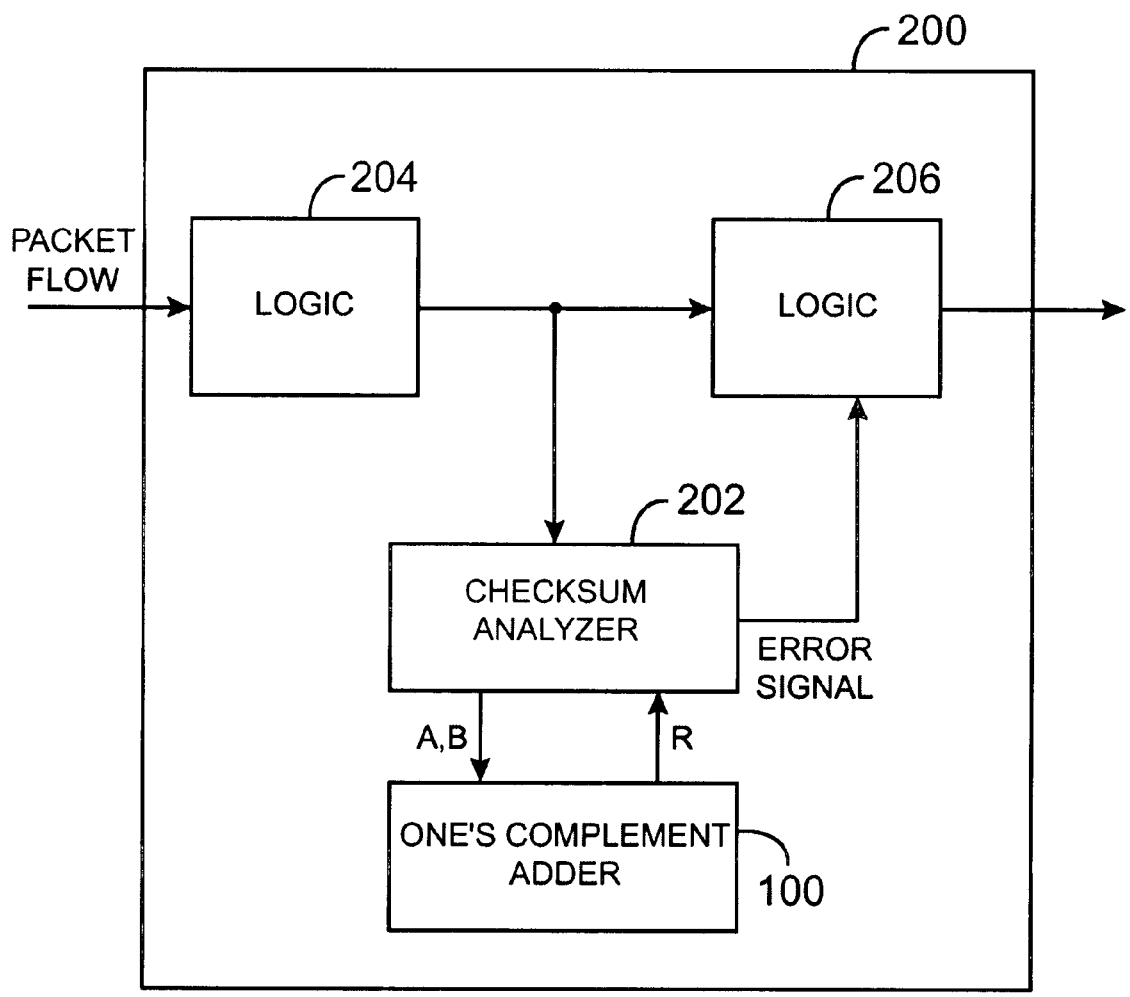
FIG. 4 is a block diagram of a packet processor which uses the one's complement adder of FIG. 2 to process packets such as those shown in FIG. 3.

FIG. 4 is a block diagram of a device 200 that uses a one's complement adder, such as one's complement adder 100 shown in FIG. 2, to quickly calculate and check checksums. Device 200 is shown comprising a packet processor 202 with one's complement adder 100. As packets pass through device 200, they are processed by logic circuits 204, 206. As the data from the packets passes from logic circuit 204 to logic circuit 206, it is read by checksum processor 202. In some implementations, the tap for checksum processor 202 is before all other active processing in device 200, in which case logic 204 would be replaced with a pass-though. However checksum processor 202 obtains the packet data, it processes the packet headers, as described above, using one's complement adder 100 to perform the one's complement addition. Checksum processor 202 outputs an error signal ("error" or "no error") depending on the result of the addition. That error signal is used, among other uses, by logic circuit 206 to decide whether to drop a corrupted packet.

The above description is illustrative and not restrictive. Many variations of the invention will become apparent to those of skill in the art upon review of this disclosure. For example, the one's complement adder of the present invention could be used in any other circuit needing a one's complement adder calculation. Also, the examples above generally operate on two addends at a time, however one skilled in the art would, after reading this disclosure, be able to generalize to adders with more than two addends without undue experimentation. Furthermore, although a multiplexer is used to select among the results provided by the two's complement adders, other selector logic could be used in place of a multiplexer. The scope of the invention should, therefore, be determined not with reference to the above description, but instead should be determined with reference to the appended claims along with their full scope of equivalents.

What is claimed is:

1. A one's complement adder for adding a first addend and a second addend to determine a one's complement sum of the first and second addends, comprising:
   a first two's complement adder coupled to receive the first and second addends at addend inputs and adapted to output a first sum, wherein the first sum is the one's complement sum that would result if no carry occurred upon addition of the first and second addends;
   a second two's complement adder coupled to receive the first and second addends at addend inputs and adapted to output a second sum, wherein the second sum is the one's complement sum that would result if a carry occurred upon addition of the first and second addends; and a selector coupled to receive the first sum from the first two's complement adder and the second sum from the second two's complement adder and the selector coupled to receive an indication of whether the carry occurred or not, wherein the selector is adapted to output the first sum as the one's complement sum when the indication indicates that the carry did not occur and to output the second sum as the one's complement sum when the indication indicates that the carry did occur.

2. The one's complement adder of claim 1, wherein the indication of whether the carry occurred or not is provided by a carry output of the first two's complement adder coupled to a select input of the selector.

3. The one's complement adder of claim 2, further comprising:

a carry input of the first two's complement adder coupled to receive a logic level representing no carry; and a carry input of the second two's complement adder coupled to receive a logic level representing a carry.

4. The one's complement adder of claim 1, wherein the selector is an N-bit multiplexer, the first and second two's complement adders are N-bit adders, the first and second addends are N-bit binary numbers, the one's complement sum is an N-bit binary number and N is an integer greater than one.

5. The one's complement adder of claim 1, wherein the first and second two's complement adders are independent logic units clocked by a logic clock such that the first sum and the second sum are calculated in one clock cycle of the logic clock.

6. A packet processing device comprising:

an input for receiving packet data;

logic, coupled to the input, for identifying packet header data and a packet checksum;

a checksum evaluator comprising a one's complement adder for adding bit sequences from the packet header data using one's complement addition, the one's complement adder comprising:

a) a first two's complement adder coupled to receive a first and a second addend at addend inputs and adapted to output a first sum, wherein the first sum is the one's complement sum that would result if no carry occurred upon addition of the first and second addends;

b) a second two's complement adder coupled to receive the first and second addends at addend inputs and adapted to output a second sum, wherein the second sum is the one's complement sum that would result if a carry occurred upon addition of the first and second addends; and c) a selector coupled to receive the first sum from the first two's complement adder and the second sum from the second two's complement adder and the selector coupled to receive an indication of whether the carry occurred or not, wherein the selector is adapted to output the first sum as the one's complement sum when the indication indicates that the carry did not occur and to output the second sum as the one's complement sum when the indication indicates that the carry did occur; and logic, coupled to receive the error signal from the checksum evaluator, for taking a predefine action based on the error signal.

7. The packet processing device of claim 6, wherein the packet data, the packet header data and the packet checksum are for TCP/IP packets.

8. The packet processing device of claim 6, wherein the packet data, the packet header data and the packet checksum are for UDP packets.

9. The packet processing device of claim 6, wherein the bit sequences are sixteen bit words.

10. A high-speed packet router adapted to be coupled to the Internet comprising at least one packet processing device according to claim 6.

* * * * *